United States Patent
Bayer et al.

(10) Patent No.: US 6,534,963 B2
(45) Date of Patent: Mar. 18, 2003

(54) DC/DC CONVERTER CIRCUIT

(75) Inventors: Erich-Johann Bayer, Thonhausen (DE); Hans Schmeller, Falkenberg (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/875,489

(22) Filed: Jun. 6, 2001

(65) Prior Publication Data

US 2002/0017898 A1 Feb. 14, 2002

(30) Foreign Application Priority Data

Jun. 29, 2000 (DE) .......................... 100 30 795

(51) Int. Cl.[7] .......................... G05F 03/16; G05F 03/20
(52) U.S. Cl. ...................................... 323/313
(58) Field of Search ................................. 323/313, 314, 323/315, 316, 269, 270, 273, 274, 275, 277, 280, 281

(56) References Cited

U.S. PATENT DOCUMENTS

| 5,680,300 A | | 10/1997 | Szepesi | |
| 5,864,227 A | * | 1/1999 | Borden | ........................ 323/280 |
| 5,939,867 A | * | 8/1999 | Capici | .................... 323/280 X |
| 5,941,990 A | | 8/1999 | Hiiragizawa | |
| 6,207,375 B1 | * | 3/2001 | Larson | .................... 323/280 X |

FOREIGN PATENT DOCUMENTS

EP          0 644 646 A1    3/1995

* cited by examiner

Primary Examiner—Jessica Han
(74) Attorney, Agent, or Firm—W. Daniel Swayze, Jr.; W. James Brady; Frederick J. Telecky, Jr.

(57) ABSTRACT

The invention relates to a DC/DC converter circuit including a voltage conversion circuit and a regulator circuit comprising a reference voltage generator circuit and a comparator which outputs a control signal for activating/deactivating the voltage conversion circuit as a function of the output load of the converter circuit. The converter circuit additionally comprises a circuit for signaling the regulator circuit ON/OFF comprising a comparator, at the first input of which a further voltage characterizing the output voltage and, at the second input of which a voltage at a capacitor is applied, and a control circuit comprising switches which during the ON time of the regulator circuit control the capacitor so that it is charged to a voltage which differs by a predetermined amount from the voltage characterizing the output voltage, and when it has attained the design value it signaling the regulator circuit OFF and separating the capacitor from the charging voltage, the comparator outputting a signal to the control circuit when the further voltage characterizing the output voltage and the voltage across the capacitor agree, resulting in the regulator circuit being returned ON.

20 Claims, 3 Drawing Sheets

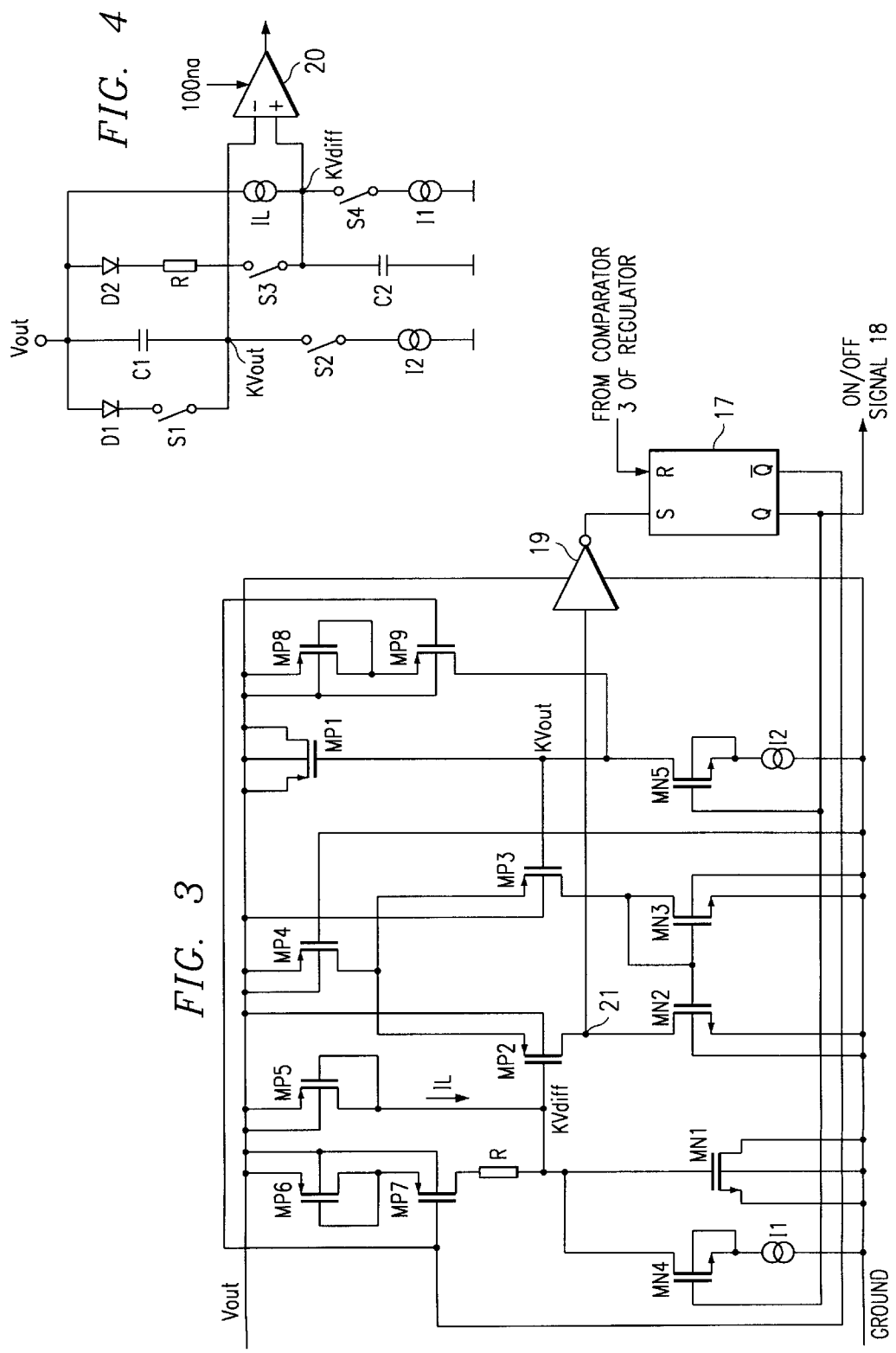

DC/DC CONVERTER CIRCUIT

BACKGROUND OF THE INVENTION

The invention relates to a DC/DC converter circuit including a voltage conversion circuit which in active operation is able to convert the input voltage of the DC/DC converter circuit into an output voltage of the DC/DC converter circuit differing from the input voltage, a regulator circuit for regulating the output voltage to a predetermined design value, the regulator circuit comprising a reference voltage generator circuit and a comparator, at the first input of which a voltage characterizing the output voltage and, at the second input of which the reference voltage generated by the reference voltage generator circuit is available and which outputs a control signal for activating/deactivating the voltage conversion circuit as a function of MIN/MAX violation of the design value by the output voltage.

One such DC/DC converter circuit is known from prior art and reads e.g. from the background description of the U.S. Pat. No. 5,680,300 ("Regulated charge pump DC/DC converter"). The voltage conversion circuit of the described DC/DC converter circuit comprises a charge pump circuit.

One disadvantage of the circuit as described at the outset is that when the current requirement at the output of the circuit is relatively small or zero, e.g. in standby operation, a relatively large current consumption materializes. This is due to the fact that the regulator circuit itself, i.e. the reference voltage generator circuit and the comparator continue to consume current. When a bandgap reference is used as the reference voltage generator circuit a voltage divider may furthermore be provided which divides from the output voltage a voltage which is adapted to the reference voltage and applied to the first input of the comparator as the voltage characterizing the output voltage. The voltage divider too consumes current when the DC/DC converter circuit is on standby.

To reduce the standby current consumption of such circuits, i.e. when the output of the circuit has no or very little current consumption, a DC/DC converter circuit is proposed by Linear Technology in its DC/DC converter LTC151G in which a change is made from standby to normal operation by a signal applied to the circuit from without. This circuit was described on the homepage of Linear Technology available e.g. on Jun. 10, 2000 under the address "www.linear-tech.com". The signal for making the change from standby to normal operation is furnished to the DC/DC converter circuit by a microprocessor. In this arrangement an ON pin of the circuit receives during standby a signal with a high duty cycle (e.g. 95 to 98%) adapted to the max. standby current of e.g. 100 $\mu$A as established prior by relating the max. permissible OFF time for this standby current to the mm. ON time in determining the duty cycle. When the ON time is e.g. 0.2 ms and the max. permissible OFF time is 10 ms the circuit consumes current only during 2% of the ON time during standby as compared to normal operation.

One disadvantage of the circuit as described is that it cannot automatically make the changeover between normal operation and standby. Another disadvantage is that during standby the ON/OFF ratio is fixed and not adapted to the actual current consumption required at the output of the DC/DC converter circuit at any one time which results in a relatively high standby current consumption of the DC/DC converter circuit.

Referring now to FIG. 1 there is illustrated by way of a block diagram a prior art DC/DC converter circuit wherein the modules 1, 2, 3, 4 and 5 usually grouped together into an integrated circuit are illustrated boxed.

The known DC/DC converter circuit comprises a voltage conversion circuit which in this case consists of a charge pump circuit. The charge pump circuit consists of a charge pump capacitor Cpump, an output stage 1 comprising the controllable switches of the charge pump and connected to the input voltage Vcc of the circuit, and a control circuit 2 including oscillator and driver for signaling the controllable switches which may be MOS-FETs, for example. The control circuit 2 receives its current from the input voltage source Vcc. In active operation the control circuit 2 controls the switches of the charge pump circuit cyclically so that the charge pump capacitor is firstly switched in a first phase so that it is charged to the input voltage Vcc of the DC/DC converter circuit and then in a second phase is switched so that it is in series with the input voltage Vcc so that at the output of the circuit a voltage materializes which is higher than the input voltage Vcc and at the most may correspond to roughly twice the input voltage Vcc. Such charge pump circuits capable of converting an input voltage into a higher, lower or inverted voltage at the output are known in prior art as described e.g. in the text book "The art of electronics" by Paul Horowitz and Winfried Hill, 2nd edit., Cambridge University Press, 1989, page 377 et seq.

The known DC/DC converter circuit comprises furthermore at the output a storage capacitor Cout on which the output voltage Vout of the circuit is stored. Connected in parallel thereto is a resistor R1 indicated in FIG. 1 symbolizing the load applied to the output of the DC/DC converter circuit.

In addition, the known DC/DC converter circuit comprises a regulator circuit consisting of a comparator 3, a bandgap reference voltage generator circuit 4 and a voltage divider 5.

In this arrangement the comparator 3 receives at its first input 6 part of the output voltage Vout of the DC/DC converter circuit divided by the voltage divider adapted to the reference voltage Vref generated by the bandgap reference voltage generator circuit applied to the second input 7 of the comparator.

The comparator, whose output is connected to the control circuit 2, regulates the output voltage of the DC/DC converter circuit by the skip-mode principle to a predetermined design value by it outputting a control signal to activate, and a control signal to deactivate, the voltage conversion circuit (1, 2, Cpump) as a function of MAX/MIN violation of the design value by the output voltage Vout of the DC/DC converter circuit so that the charge pump circuit is only ON in MIN violation of the predetermined design value by the output voltage Vout.

As already described above, the circuit as shown in FIG. 1 has the disadvantage that it has a relatively high current consumption since the regulator circuit is also ON when the circuit is on standby, it being the comparator in actual practice which consumes the most current (e.g. Icc=20 $\mu$A) followed by the reference voltage generator circuit (e.g. Icc=10 $\mu$A) and the voltage divider (e.g. Icc=6 $\mu$A).

SUMMARY OF THE INVENTION

An aspect of the present invention is to provide a DC/DC converter circuit which overcomes the cited disadvantages and features a lower standby current consumption as compared to prior art circuits of this kind.

This aspect is achieved by a DC/DC converter circuit as cited at the outset in which the DC/DC converter circuit additionally comprises a circuit for signaling the regulator circuit ON/OFF comprising a comparator, at the first input of which a further voltage characterizing the output voltage and, at the second input of which a voltage at a capacitor is applied, and a control circuit comprising one or more controllable switches, the control circuit receiving the control signal of the comparator of the regulator circuit and the output signal of the comparator of the circuit for signaling the regulator circuit ON/OFF as well as outputting a signal (s) for controlling the switch(es) during the ON time of the regulator circuit controlling the switch(es) so that the capacitor is connected by a voltage defined by the regulator circuit so that it is charged to a voltage which differs by a predetermined amount from the voltage characterizing the output voltage, and when it is signaled by the comparator of the regulator circuit that the voltage has attained the design value it outputting the signal for signaling OFF the regulator circuit and controlling the switch(es) so that the capacitor is separated from the charging voltage so that it is gradually discharged, the comparator of the circuit for signaling the regulator circuit ON/OFF outputting a signal to the control circuit when the further voltage characterizing the output voltage and the voltage across the capacitor agree, resulting in the control circuit being prompted to output the signal for signaling the regulator circuit ON.

The invention achieves a considerable reduction in the standby current consumption by it firstly signaling all current consumers of the regulator circuit OFF as soon as the design value at the output of the DC/DC converter circuit is attained. Once the regulator circuit has been signaled OFF, monitoring the output voltage is handled by the circuit for signaling the regulator circuit ON/OFF, the comparator of which receives—unlike the comparator of the regulator circuit—no absolutely precise reference voltage, but instead a voltage briefly applied to the capacitor and defined by the regulator circuit with sufficient accuracy at an output which differs by a predetermined amount from the voltage applied to its other input and characterizing the momentary output voltage. In this arrangement the voltage across the capacitor is always refreshed whenever the comparator of the circuit for signaling the regulator circuit ON/OFF outputs the ON signal. On standby the circuit in accordance with the invention adapts the standby current consumption of the circuit dynamically to the output current required at the output of the DC/DC converter circuit. This enables the DC/DC converter circuit in accordance with the invention, unlike prior art circuits of the kind, to significantly reduce the standby current consumption of the circuit simply and efficiently.

BRIEF DESCRIPTION OF THE DRAWINGS

The invention will now be detailed by way of examples with reference to the drawings in which:

FIG. 3 is a circuit diagram of a circuit for signaling the regulator circuit ON/OFF of the DC/DC converter circuit as shown in FIG. 2;

FIG. 4 is a single-line diagram of the circuit as shown in FIG. 3 to assist in explaining how it works.

DETAILED DESCRIPTION

Figure 1:
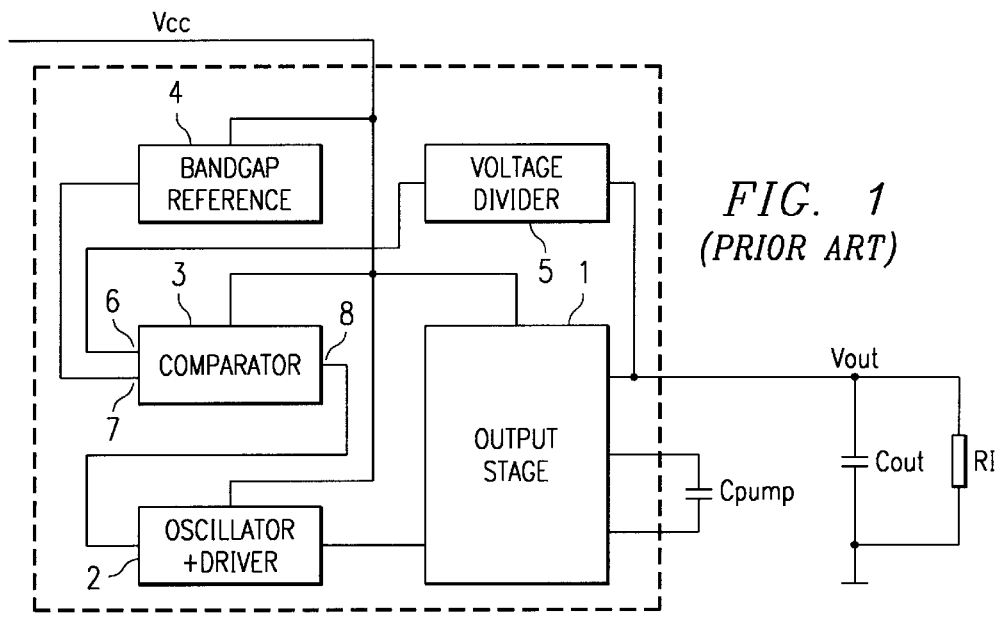
FIG. 1 is block diagram of a prior art DC/DC converter circuit.
Figure 2:
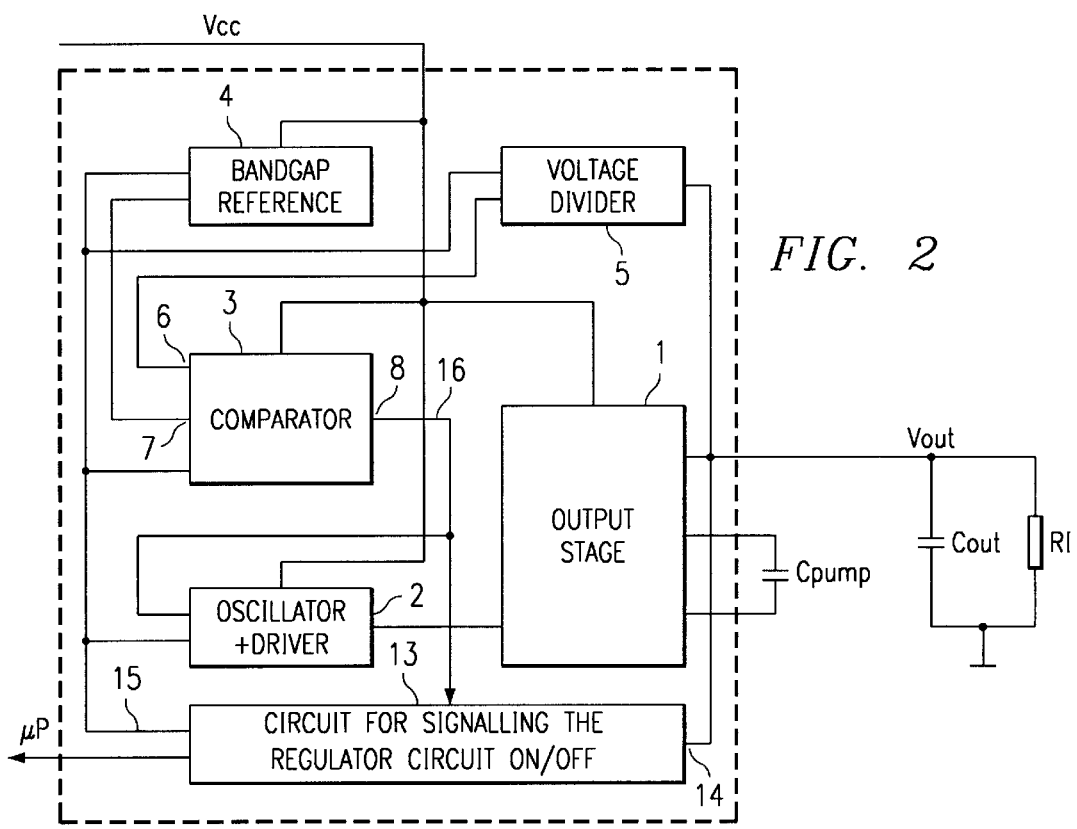
FIG. 2 is a block diagram of a first embodiment of the DC/DC converter circuit in accordance with the invention.

Referring now to FIG. 2 there is illustrated in a block diagram one embodiment of a DC/DC converter circuit in accordance with the invention. Since the majority of the components of this embodiment of the DC/DC converter circuit in accordance with the invention is the same as those as shown in FIG. 1 only the components and connections will be described which are new as compared to the circuit as shown in FIG. 1.

The DC/DC converter circuit as shown in FIG. 2 comprises a circuit 13 which is the circuit for signaling the regulator circuit ON/OFF. In this arrangement the output 15 of the circuit 13 for signaling the regulator circuit ON/OFF is connected to the individual elements 3, 4 and 5 of the regulator circuit as well as to the control circuit 2. The circuit 13 for signaling the regulator circuit ON/OFF signals the regulator circuit, i.e. the comparator 2, the bandgap reference voltage generator circuit 4 and the voltage divider 5 OFF when the DC/DC converter circuit is on standby, i.e. when the output voltage Vout violates the design value MAX. Optionally the voltage conversion circuit (control circuit 2) may also be signaled OFF, meaning in this case separated from the supply voltage Vcc (or from the output voltage Vout at the voltage divider 5) while signaling ON being understood to mean the reconnection to the supply voltage Vcc (or to the output voltage Vout at the voltage divider 5).

During standby when a low output current is required, the circuit 13 for signaling the regulator circuit ON/OFF handles monitoring the output voltage Vout of the DC/DC converter circuit, it receiving for this purpose at an input 14 the output voltage Vout of the DC/DC converter circuit. It furthermore receives at a further input 16 from the comparator 3 of the regulator circuit the control signal indicating whether the output voltage Vout is in MAX or MIN violation of the design value. The regulator circuit can only be signaled OFF when this signal indicates that the output voltage is in MAX violation of the design value. The circuit 13 for signaling the regulator circuit ON/OFF comprises optionally a further input via which a microprocessor ($\mu$p) can input a control signal, the function of which will be described later.

Referring now to FIG. 3 there is illustrated by way of example a possible configuration of the circuit 13 for signaling the regulator circuit ON/OFF as shown in FIG. 2. The function of the individual MOS-FETs as shown in FIG. 3 is evident from the circuit diagram as shown in FIG. 4 in which the MOS-FETs are replaced by components satisfying their function.

Referring now to FIGS. 3 and 4 the configuration of the circuit 13 for signaling the regulator circuit ON/OFF in accordance with the invention will now be detailed.

The circuit 13 comprises a comparator 20 made up of two P MOS-FETs MP2 and MP3 at the gates of which the voltages to be compared are applied, a current mirror comprising N MOS-FETS MN2 and MN3 and a current source formed by P MOS-FET MP4 which determines the current consumption of the comparator 20. Since the function of a comparator 20 as shown in FIG. 3 is known from prior art this is not detailed in the following.

The source of the P MOS-FET MP4 forming the current source of the comparator 20 is connected to the output voltage Vout of the DC/DC converter circuit, its drain to the sources of the P MOS-FETs MP2 and MP3, its gate to ground and its substrate to the output voltage Vout.

The drain of the P MOS-FET MP2 is connected to the drain of the N MOS-FET MN2 and its substrate to the output voltage Vout. The drain of the P MOS-FET MP3 is connected to the drain of the N MOS-FET MN3 and its substrate to the output voltage Vout.

The sources and substrates of the two N MOS-FETs MN2 and MN3 forming the current mirror are connected to ground while their gates are connected to each other. Gate and source of the N MOS-FET MN3 are connected to each other.

Diodes MP6 and MP8 formed by P MOS-FETs are provided for setting the working point of the comparator 20. In this arrangement the sources and the substrates of the diodes MP6 and MP8 are connected to the output voltage Vout while their gates are connected to the corresponding drains. The diodes MP8 and MP6 formed by the P MOS-FETs are identified D1 and D2 respectively in FIG. 4.

The gates of the P MOS-FETs MP2 and MP3 form the differential inputs of the comparator and each is connected to a MOS-FET (MN1 or MP1 in FIG. 3; C2 and C1 respectively in FIG. 4) functioning as a capacitor.

In this arrangement source, drain and substrate of the N MOS-FET MN1 forming the capacitor C2 are connected to ground while its gate is connected to the gate of the P MOS-FET MP2, i.e. the one differential input of the comparator 20.

Source, drain and substrate of the P MOS-FET MP1 forming the capacitor C1 are connected to the output voltage Vout while its gate is connected to the gate of the P MOS-FET MP3, i.e. the other differential input of the comparator 20.

MOS-FETs MN5, MP9 (S2, S1 in FIG. 4) and MN4, MP7 (S4, S3 in FIG. 4) form switches with which the nodal points Kvdiff (gate of the N MOS-FET MN1 acting as C2 and gate of the P MOS-FET MP2 (first differential input of the comparator 20)) and Kvout (gate of the P MOS-FET MP1 acting as C1 and gate of the P MOS-FET MP3 (second differential input of the comparator 20)) can be isolated. All four switches MN5, MP9, MN4 and MP7 are controlled by a control circuit 17 which in the example embodiment as shown in FIG. 3 consists of a flip-flop circuit (e.g. RS flip-flop).

The four switches are circuited as follows: the source of the P MOS-FET MP7 is connected to the drain of the P MOS-FET MP6, its drain is connected via a resistor R to the gate of the N MOS-FET MN1 acting as capacitor C2, its substrate is connected to the output voltage Vout and its gate to the output 32 of the control circuit 17.

The source of the N MOS-FET MN4 is connected via the current source I1 to ground, its drain is connected to the gate of the P MOS-FET MP2, its substrate is connected to its source and its gate to the output 31 of the control circuit 17.

The source of the P MOS-FET MP9 is connected to the drain of the P MOS-FET MP8, its drain to the gate of the P MOS-FET MP3, its substrate to the output voltage Vout and its gate to an output 32 of the control circuit 17.

The source of the N MOS-FET MN5 is connected via the current source I2 to ground, its substrate to its source and its gate to the output 31 of the control circuit 17.

The P MOS-FET MP5, whose source and substrate are connected to the output voltage Vout and whose gate is connected to the drain, which is in turn connected to the circuit point Kvdiff serves to set a precisely defined leakage current between Vout and the circuit point Kvdiff (gate of the N MOS-FET MN1 acting as capacitor capacitor C2 and gate of the P MOS-FET MP2 (first differential input of the comparator 20)).

The output 21 of the comparator 20 is connected to an inverting amplifier 19 which is supplied by the output voltage Vout, at the output of which a signal is generated which is used to signal the regulator circuit ON as detailed below.

The output of the inverting amplifier 19 is connected to an input 33 of the flip-flop (RS flip-flop) forming the control circuit 17. At the other input 34 of the flip-flop of the control circuit 17 the control signal (16 in FIG. 2) furnished by the comparator 3 of the regulator circuit is applied, indicating MAX/MIN violation of the design value by the output voltage Vout of the DC/DC converter circuit.

The function of the circuit 13 as shown in FIGS. 3 and 4 as well as the DC/DC converter circuit as shown in FIG. 2 will now be detailed.

It is firstly assumed to simplify the description that the control circuit 17 has just output an ON signal 18 to signal the regulator circuit ON (the conditions under which this ON signal is output and how it is generated is explained further on).

The ON signal 18 is output when at the set input (S) of the control circuit 17 a signal from the comparator of the circuit for signaling the regulator circuit ON/OFF is furnished as explained below.

This results in the signals at the two outputs (Q and Qquer) of the flip-flop 17 changing for control of the aforementioned switches, i.e. signaling MN4 (S4), MP7 (S3), MP9 (S1) and MN5 (S2) ON, as a result of which the two capacitors C1 (MP1) and C2 (MN1) are charged.

In this arrangement the capacitor C2 (MN1)—when the output voltage of the converter has reattained its design value—is charged to a voltage $$VC2 = Vout(des) - Vgs - Vout \qquad (1)$$

where Vout(des) is the voltage just set by the regulator circuit to its design value Vout(des), Vgs is the drop in voltage across the diode D2 (MP6) and Vout (=R*I) is the drop in voltage across the predetermined resistor R. The voltage VC2 is applied to the first input (KVdiff) of the comparator 20 of the circuit 13 for signaling the regulator circuit ON/OFF.

The capacitor C1 (MP1) is simultaneously charged to a voltage $$VC1 = Vout - Vgs \qquad (2)$$

assuming that MOS diodes D1 and D2 (MP8 and MP6 respectively) are the same so that the drop in voltage across them is identical. The voltage VC1 is applied to the second input (KVout) of the comparator 20.

The difference in the input voltages of the comparator 20 at the end of the charging phase is VC2−VC1=Voff which can be set by correspondingly setting the resistor R to a desired value.

When the regulator circuit is signaled ON, a distinction is made between two possible resulting cases:

In the first case, the output voltage Vout of the DC/DC converter circuit is still in MAX violation of its design value when the regulator circuit is signaled ON so that there is no need to activate the charge pump. A (not shown) first delay circuit (e.g. an RC pad) connected to the comparator of the regulator circuit ensures that the comparator does not output a control signal (which is passed on to the input R of the flip-flop 17) to the output until timeout of a first delay time (e.g. 30 microsecs). This first delay time serves to make sure that the elements important for regulation have settled down to permit a sensible voltage comparison by the comparator of the regulator circuit and, on the other hand, ensuring in the first case that sufficient time is available to fully charge the capacitors to the desired voltages.

The comparator 3 of the regulator circuit then outputs its control signal which is passed on to the input R of the flip-flop 17 of the control circuit, as a result of which the signals change state at the outputs of the flip-flop (Q and Qquer) and the MOS-FET switches MN4 (S4), MP7 (S3), MP9 (S1) and MN5 (S2) are signaled OFF so that the two inputs (KVdiff, KVout) of the comparator 20 are isolated. At the same time the OFF signal 18 is directed from the output Q of the flip-flop to the regulator circuit. This OFF signal is applied to the comparator 3, the reference voltage generator circuit 4, the voltage divider 5 and to the control circuit 2 signaling them OFF (e.g. by activating switches not shown).

In the second case when the DC/DC converter circuit is signaled ON the output voltage is in MIN violation of its design value so that on timeout of the first delay time the comparator of the regulator circuit "sees" that Vout<Vdes, it then outputting a control signal to the control circuit 2 of the charge pump, activating the charge pump. Once the design value of the output voltage has been reattained by pump operation a second (likewise not shown) delay circuit in connection with the comparator on timeout of a second delay time (e.g. 3–5 microseconds) ensures that the charge pump continues to output to make sure that the capacitors can be fully recharged to their desired values as stated above.

On timeout of this second delay time the comparator 3 of the regulator circuit again outputs its control signal which is directed to the input R of the flip-flop 17 of the control circuit, resulting in the signals changing state at the outputs of the flip-flop (Q and Qquer) and the MOS-FET switches MN4 (S4), MP7 (S3), MP9 (S1) and MN5 (S2) being signaling OFF so that the two inputs (KVdiff, KVout) of the comparator 20 are isolated. At the same time the OFF signal 18 is directed from the output Q of the flip-flop to the regulator circuit. This OFF signal is applied to the comparator 3, to the bandgap reference voltage generator circuit 4, to the voltage divider 5 and to the control circuit 2 signaling them OFF (e.g. by activating switches not shown).

Due to capacitors C1 and C2 being charged a voltage difference appears at the inputs of the comparator 20.

Ignoring, for the time being, the leakage current via the MOS-FET MP5 the voltage at the first input (KVdiff) of the comparator 20 would tend to remain during the OFF time of the regulator circuit at the value Vout(des)–Vgs –Voff while the voltage at the second input (KVout) of the comparator 20 would amount to Vout–Vgs. Since the voltage at the first input (KVdiff) is capacitively coupled to ground and the voltage at the second input (KVout) is capacitively coupled to the actual output voltage Vout a reduction in the actual output voltage Vout by more than the voltage difference Voff would change the level of the output signal of the comparator 20 so that at the output a signal would be output which attains via the inverting amplifier 19 the S input of the flip-flop of the control circuit 17 and by which the output level changes ultimately at the outputs Q and Qquer of the flip-flop, resulting in the output Q of the flip-flop outputting an ON signal to reactivate the regulator circuit (comparator 3, bandgap reference voltage generator circuit 4), i.e. it would reconnect the voltage divider 5 to the voltage supply Vout. In the embodiment as shown in FIG. 2 the control circuit 2 including the oscillator and drivers would then be returned ON, i.e. connected to the voltage supply Vcc.

Since in generating the output signal of the comparator of the circuit for signaling the regulator circuit ON/OFF applied to the S input of the flip-flop of the control circuit 17 the two output signals Q and Qquer of the flip-flop change state, at the same time as the regulator circuit is signaled ON also the voltage is rendered actual across the capacitors C1 and C2 by the switches S1 to S4 being closed by the control signal in the way as described above. The whole sequence is then cycled anew.

The leakage current IL not taken into account hitherto in flowing through the MOS-FET MP5 is needed to force the leakage current—automatically occurring at the two capacitively coupled inputs KVdiff and KVout of the comparator 20 of the circuit 13 for signaling the regulator circuit ON/OFF—in the right direction. In this arrangement the leakage current flowing via MP5 is set so that it dominates in amount over the leakage currents ("junction leakages") automatically occurring at the inputs of the comparator 20 to thus prevent an undesirable runaway of the voltage divider between the capacitors C1 and C2 which in a worst case could result in the regulator circuit not being returned ON. The defined leakage current thus ensures a recycled return ON of the regulator circuit as shown in FIG. 5.

Figure 5:
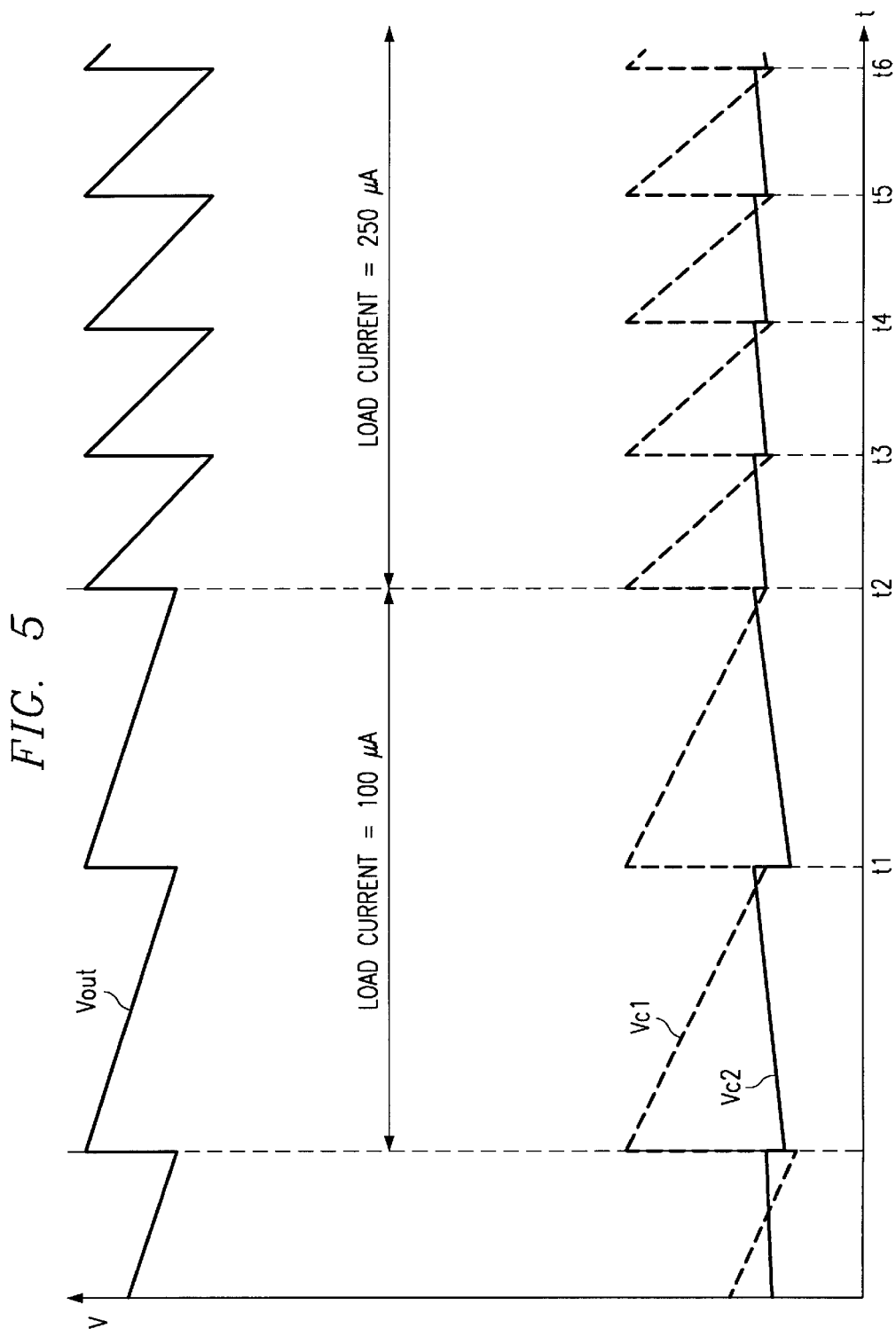
FIG. 5 is a plot of the output voltage of the DC/DC converter circuit as well as of the voltages applied to the two inputs of the comparator of the circuit for signaling the regulator circuit ON/OFF with time to assist in explaining how it works.

Referring now to FIG. 5 there is illustrated in the upper half the profile of the output voltage Vout of the DC/DC converter circuit for two different standby currents (100 $\mu$A and 250 $\mu$A) at the output of the DC/DC converter circuit. The plot in the lower half of FIG. 5 depicts the profiles of the capacitor voltages Vc1 and Vc2 applied to the two inputs of the comparator 20 of the circuit 13 for signaling the regulator circuit ON/OFF, Vc1 being the voltage across the capacitor C1. The voltage Vc1 runs parallel to the output voltage Vout. The profile of the voltage Vc2 across the capacitor C2 is defined by the leakage current IL flowing via the MOS-FET MP5, this leakage current IL forcing the voltage Vc2 to gradually approach the voltage Vc1 characterizing the output voltage Vout in time to thus prevent runaway of the voltages Vc1 and Vc2 and an undefined status of the circuit.

Just before the point in time t1 as shown in FIG. 5 the two voltages Vc1 and Vc2 respectively across the capacitors C1 and C2 respectively agree so that the comparator 20 outputs a signal by which then via the control circuit 17 in the way as described above the regulator circuit (or the voltage conversion circuit) is returned ON. If the output voltage has since violated its MIN design value the charge pump is "jogged" by the comparator 3 and control circuit 2 in the way as described above and pump-charges the output capacitor Cout until the design value is reattained. In this arrangement the switches S1 to S4 remain ON until timeout of the delay time so that the capacitors C1 and C2 are charged. The capacitors C1 and C2 then reattain their starting status (see above equations (1) and (2)) at the point in time t1 as shown in FIG. 5, the voltage difference Voff appearing at the inputs of the comparator 20 of the regulator circuit. The regulator circuit is then returned OFF by the comparator 3 of the regulator circuit in cooperation with the control circuit 17 and the whole sequence is recycled.

It may be, as described above, that there is no need to signal the charge pump ON once the regulator circuit has been signaled ON by the circuit 13, because the output voltage Vout is still in MAX violation of the design value. In this case—as described above—only the capacitors C1 and C2 are recharged to their defined voltages Vc1 and Vc2 respectively, without the charge pump being activated.

The DC/DC converter circuit in accordance with the invention is capable of dynamically adapting the standby current consumption to the standby load current required at the output of the DC/DC converter circuit at any one time, as evident from the right-hand portion of the FIG. 5. If the standby load current increases (in FIG. 5 from 100 μA to 250 μA) the capacitor C1 discharges quicker so that the ON frequency of the regulator circuit (see ON points in time t2 to t6 in FIG. 5) increases. The DC/DC converter circuit in accordance with the invention is thus able to automatically set an optimal ON frequency for each standby current hitherto not possible in prior art DC/DC converter circuit of this kind. In this arrangement the ON frequency is preferably proportional to the standby current, signaling the regulator circuit ON being assured not only on a linear drop in the output voltage Vout but also on a sudden drop in the output voltage Vout.

The comparator 20 of the circuit 13 for signaling the regulator circuit ON/OFF is preferably configured so that its current consumption is substantially less than that of the comparator 3 of the regulator circuit, e.g. in the ratio 20 μA to 100 μA. In designing the comparator 20 in actual practice a compromise needs to be made between the switching speed of the comparator and current consumption, i.e. the faster the comparator needs to be, the higher its current consumption.

The DC/DC converter circuit in accordance with the invention is preferably configured as an integrated circuit.

Furthermore, as a rule it includes a start-up circuit, not described above, which ensures that the capacitors of the circuit 13 for signaling the regulator circuit ON/OFF are charged for the first time when the DC/DC converter circuit is signaled ON.

As already described activating and deactivating the circuit 13 for signaling the regulator circuit ON/OFF may also be microprocessor-controlled independently of the actual output voltage Vout of the DC/DC converter circuit (see in this respect the microprocessor input μp as shown in FIG. 2) activated by a key strike, e.g. as in the case of a mobile telephone in when the user strikes a key the microprocessor is switched from a standby mode for monitoring the output voltage in the circuit 13 for signaling the regulator circuit ON/OFF and the regulator circuit is mostly OFF to an active mode in which the regulator circuit itself monitors the output voltage Vout.

The DC/DC converter circuit in accordance with the invention may be integrated in a DC/DC converter. It may also be integrated furthermore in a battery.

The person skilled in the art will readily appreciate that the embodiments as described above have been selected merely by way of example and that many other embodiments are feasible within the scope of the attached claims.

Thus, the voltage conversion circuit must not necessarily consist of a charge pump circuit, it may include any voltage conversion circuit which is alternatingly signaled ON/OFF as a function of the status of the output voltage Vout of the DC/DC converter circuit, e.g. it may also be an inductive converter circuit.

It is furthermore obvious that the voltage to which the capacitor of the circuit 13 for signaling the regulator circuit ON/OFF is charged, carrying a voltage differing by a specific amount from the further voltage characterizing the output voltage, need not be necessarily the output voltage of the DC/DC converter circuit defined by the regulator circuit. For example it could also be the reference voltage generated by the reference voltage generator circuit or a voltage generated therefrom. The only thing important is that the regulator circuit is made use of to define the voltage across one of the capacitors of the circuit 13 for signaling the regulator circuit ON/OFF, after which it is signaled OFF and the capacitor carrying this voltage serves during the OFF status of the regulator circuit to take over the function of a reference voltage source in the circuit 13 for signaling the regulator circuit ON/OFF.

What is claimed is:

1. A DC/DC converter circuit comprising a voltage conversion circuit which in active operation is able to convert the input voltage of said DC/DC converter circuit into an output voltage of said DC/DC converter circuit differing from said input voltage, a regulator circuit for regulating said output voltage to a predetermined design value, said regulator circuit comprising a reference voltage generator circuit and a comparator, at the first input of which a voltage characterizing said output voltage and, at the second input of which the reference voltage generated by said reference voltage generator circuit is available and which outputs a control signal for activating/deactivating said voltage conversion circuit as a function of MIN/MAX violation of the design value by said output voltage wherein said DC/DC converter circuit additionally comprises a circuit for signaling said regulator circuit ON/OFF comprising a comparator, at the first input of which a further voltage characterizing said output voltage and, at the second input of which a voltage at a capacitor is applied, and a control circuit comprising one or more controllable switches, said control circuit receiving said control signal of said comparator of said regulator circuit and said output signal of said comparator of said circuit for signaling the regulator circuit ON/OFF as well as outputting a signal for controlling the switch during the ON time of said regulator circuit controlling the switch so that said capacitor is connected by a voltage defined by said regulator circuit so that said capacitor charged to a voltage which differs by a predetermined amount from said voltage characterizing the output voltage, and when said capacitor signaled by said comparator of said regulator circuit that the voltage has attained the design value that outputs signal for signaling said regulator circuit OFF and controlling said switch so that said capacitor is separated from the charging voltage so that said capacitor discharged, said comparator of said circuit for signaling said regulator circuit ON/OFF outputting a signal to said control circuit when said further voltage characterizing said output voltage and the voltage across said capacitor agree, resulting in said control circuit being prompted to output the signal for signaling said regulator circuit ON.

2. The circuit as set forth in claim 1 wherein said capacitor is connected to a current path via which a predetermined leakage current from said capacitor can flow so that the voltage applied thereto approaches during discharge of said capacitor said further voltage characterizing said output voltage defined in time.

3. The circuit as set forth in claim 2 wherein said leakage current is selected so that it dominates said junction leakages automatically occurring at the inputs of said comparator of said circuit for signaling said regulator circuit ON/OFF.

4. The circuit as set forth in claim 1 wherein said voltage conversion circuit consists of a charge pump circuit.

5. The circuit as set forth in claim 1 wherein a delay circuit connected to said comparator of said regulator circuit is provided.

6. The circuit as set forth in claim 1 wherein said voltage conversion circuit consists of an inductive converter circuit.

7. The circuit as set forth in claim 1 wherein a voltage divider is provided to divide said voltage characterizing said output voltage as applied to the first input of said comparator of said regulator circuit from said output voltage so that said output voltage is adapted to said reference voltage generated by said reference voltage generator circuit.

8. The circuit as set forth in claim 7 wherein said signal for signaling said regulator circuit OFF is also used to separate said voltage divider from said output voltage, said voltage divider being reconnected to said output voltage by said ON signal.

9. The circuit as set forth in claim 1 wherein said reference voltage generator circuit is a bandgap reference.

10. The circuit as set forth in claim 1 wherein said comparator of said circuit for signaling the regulator circuit ON/OFF as compared to said comparator of said regulator circuit is configured so that it has a lower current consumption than said comparator of said regulator circuit.

11. The circuit as set forth in claim 1 further comprising a storage capacitor at its output.

12. The circuit as set forth in claim 1 wherein said comparator of said circuit for signaling the regulator circuit ON/OFF consists of a MOS-FET configured differential amplifier.

13. The circuit as set forth in claim 1 wherein the voltage defined by said regulator circuit to which said capacitor is charged is derived from said output voltage.

14. The circuit as set forth in claim 13 wherein said predetermined voltage amount is set by a resistor connected in series to said output voltage and said capacitor, this amount being dropped across said resistor in charging said capacitor.

15. The circuit as set forth in claim 1 wherein the voltage defined by said regulator circuit to which said capacitor is charged is derived from said reference voltage generated by said reference voltage generator circuit.

16. The circuit as set forth in claim 1 wherein said control circuit consists of a flip-flop.

17. The circuit as set forth in claim 1 wherein said capacitor consists of a MOS-FET.

18. The circuit as set forth in claim 17 wherein a further capacitor likewise consisting of a MOS-FET is provided which carries said further voltage characterizing said output voltage and is connected to said first input of said comparator of said circuit for signaling the regulator circuit ON/OFF.

19. The circuit as set forth in claim 1 wherein said further voltage characterizing said output voltage corresponds to said output voltage.

20. The circuit as set forth in claim 1 wherein said signal for signaling said regulator circuit OFF is also used to signal said voltage conversion circuit OFF and said signal for signaling said regulator circuit ON is also used to signaling said voltage conversion circuit ON.

* * * * *